United States Patent
Lee

(10) Patent No.: US 8,811,659 B2
(45) Date of Patent: Aug. 19, 2014

(54) OBJECT DETECTION METHOD AND APPARATUS

(75) Inventor: Dong Hun Lee, Ansan-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1101 days.

(21) Appl. No.: 12/222,302

(22) Filed: Aug. 6, 2008

(65) Prior Publication Data
US 2010/0008542 A1    Jan. 14, 2010

(30) Foreign Application Priority Data

Jul. 8, 2008 (KR) .................. 10-2008-0066176

(51) Int. Cl.
*G06K 9/00* (2006.01)

(52) U.S. Cl.
USPC ............................. 382/103; 382/199

(58) Field of Classification Search
None
See application file for complete search history.

(56) References Cited

U.S. PATENT DOCUMENTS

| | | | | |
|---|---|---|---|---|
| 5,359,672 A | * | 10/1994 | Okumura et al. | 382/168 |
| 6,493,458 B2 | * | 12/2002 | Yasui et al. | 382/104 |
| 7,130,445 B2 | * | 10/2006 | Ruhl et al. | 382/100 |
| 2007/0098264 A1 | * | 5/2007 | Van Lier et al. | 382/199 |

FOREIGN PATENT DOCUMENTS

| | | |
|---|---|---|
| JP | 2004-21888 | 1/2004 |
| JP | 2007-58375 | 3/2007 |
| KR | 10-2006/0100376 A | 9/2006 |

OTHER PUBLICATIONS

Korean Office Action issued on Jun. 10, 2009 in corresponding Korean Patent Application 10-2008-0066176.

* cited by examiner

*Primary Examiner* — Jason M Repko
*Assistant Examiner* — Katrina Fujita
(74) *Attorney, Agent, or Firm* — Staas & Halsey LLP

(57) ABSTRACT

An object detection method and apparatus is provided. When an object pixel having a target pixel value is found while an image including an object is scanned at intervals of a preset number of pixels, whether or not each pixel around the object pixel has the target pixel value is sequentially determined, while spreading to pixels around the object pixel, to find an entire pixel region constituting the object and position values of the found pixels are stored. This ensures that an entire pixel region of the object is simply, easily, quickly, and correctly found.

18 Claims, 23 Drawing Sheets

OBJECT DETECTION METHOD AND APPARATUS

CROSS-REFERENCE TO RELATED APPLICATION

This application claims the benefit of Korean Patent Application No. 2008-0066176, filed on Jul. 8, 2008 in the Korean Intellectual Property Office, the disclosure of which is incorporated herein by reference.

BACKGROUND OF THE INVENTION

1. Field of the Invention

The present invention relates to an object detection method and apparatus, and more particularly, to an object detection method and apparatus that separates and detects an object from a current image frame.

2. Description of the Related Art

Main functions of an image processing system that captures an image of an object and processes image data are to identify a background or object in the captured image and to discriminate between objects. Thus, the image processing system can identify background and object images and perform relevant functions.

Image processing to detect an object in an image is performed such that pixels constituting an object are searched for in an image plane using an image scanning algorithm and the found pixels are binarized and are then labeled and grouped. When the pixels have been grouped into an object, the image processing is completed. Image processing performance such as robustness or processing speed varies depending on an algorithm and a programming technique employed for each process.

In a line scanning method, pixels are searched for in the entire region of an image. Although this method has an advantage in that image data of the entire region of an image plane is searched, it has a problem in that it takes a long time to search the entire image region.

If the position of an object can be predicted, it will be possible to significantly reduce the time required for the search by searching for pixels only in a region corresponding to the predicted position. One example is a window tracking method in which the position of an object is predicted and pixels are searched for only in a specific region (window) in which it is predicted that the object will be located every frame. This method has higher processing speed than the line scanning method. However, the window tracking method also has the following problems. If the size of the window is reduced, the object may exit the window region, leading to a failure to detect the object, although the time required for image processing is reduced. On the other hand, if the size of the window is increased, the time required for image processing is increased although the possibility that the object will exit the window region is reduced.

As described above, the line scanning method has a problem that it requires a long search time since the entire region of the image plane should be searched although it has an advantage in that all pixels of the object to be detected can be found. On the other hand, the window tracking method has a problem in that the accuracy of prediction of the position of an object should be higher than a specific level in addition to the problem that the size of the window should be adjusted appropriately.

A dot-line scanning method may be employed to achieve the advantages of the two methods while overcoming their problems. The dot-line scanning method searches for pixels of an object while jumping pixels at specific pixel intervals in the image plane. This method has an advantage in that the image processing time is significantly reduced compared to the line scanning method.

However, the conventional dot-line scanning method has the following problems. Although an approximate pixel region constituting an object can be found since the pixel region constituting the object is searched for in the image while jumping pixels at specific pixel intervals, the accurate appearance of the object cannot be detected since an entire pixel region of the object cannot be found.

The conventional dot-line scanning method performs labeling and grouping, which are general image processing methods, in such a manner that all pixels of an image are labeled and are then grouped based on the labeled data. That is, scanning is performed twice since the pixel region of the object is scanned once and the labeled data is then scanned once more. This increases required memory capacity and calculation complexity and also increases the image processing time.

SUMMARY OF THE INVENTION

Therefore, it is an aspect of the invention to provide an object detection method and apparatus that makes it possible to simply, easily, quickly, and correctly find an entire pixel region of an object.

Additional aspects and/or advantages of the invention will be set forth in part in the description which follows and, in part, will be obvious from the description, or may be learned by practice of the invention.

The foregoing and/or other aspects of the present invention may be achieved by providing an object detection method including obtaining an image including an object; determining whether or not an object pixel having a target pixel value is present while the obtained image is scanned at intervals of a preset number of pixels; finding all pixels constituting the object by sequentially determining, when an object pixel having the target pixel value is present, whether or not each pixel around the object pixel has the target pixel value while spreading to pixels around the object pixel; and storing position values of the found pixels.

The foregoing and/or other aspects of the present invention may also be achieved by providing an object detection apparatus including an image acquisition unit to obtain an image including an object; and an image processing unit to perform a control operation to sequentially determine, when it is determined that an object pixel having a target pixel value is present while the obtained image is scanned at intervals of a preset number of pixels, whether or not each pixel around the object pixel has the target pixel value while spreading to pixels around the object pixel to find all pixels constituting the object.

The object detection method and apparatus according to the present invention has a variety of advantages. For example, when an object pixel having a target pixel value is found while an image including an object is scanned at intervals of a preset number of pixels, whether or not each pixel around the object pixel has the target pixel value is sequentially determined, while spreading to pixels around the object pixel, to find an entire pixel region constituting the object and position values of the found pixels are then stored. This ensures that an entire pixel region of the object is simply, easily, quickly, and correctly found.

In addition, since the dot-line scanning is employed, a region occupied by noise data of pixels present between pixels, to which jumps are made, is automatically skipped so that the noise region is excluded from the region to be searched, thereby achieving size filtering effects to eliminate small noise in searching.

It is also possible to simplify calculation processes required to find all pixels of the object. This reduces required memory capacity, thereby decreasing the size of products.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE PREFERRED EMBODIMENTS

Figure 1:
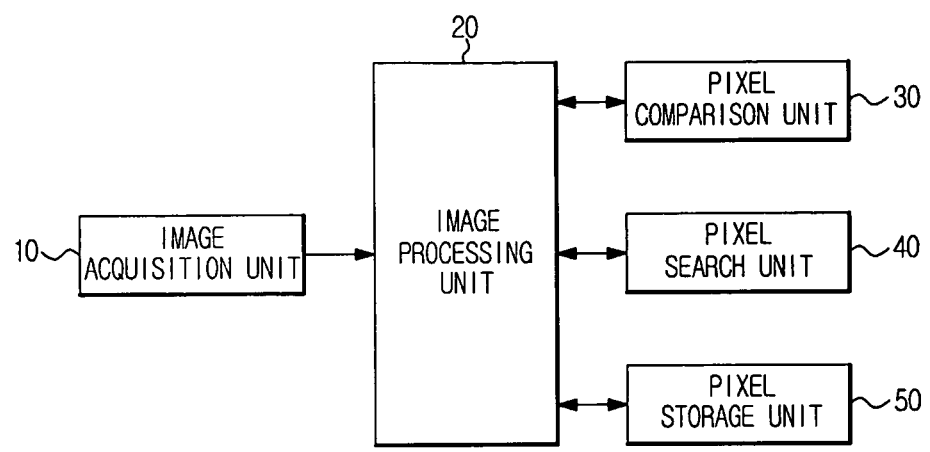
FIG. 1 is a schematic block diagram of an object detection apparatus according to an embodiment of the present invention.

Reference will now be made in detail to the embodiments of the present invention, examples of which are illustrated in the accompanying drawings, wherein like reference numerals refer to the like elements throughout. The embodiments are described below to explain the present invention by referring to the figures.

Figure 2:
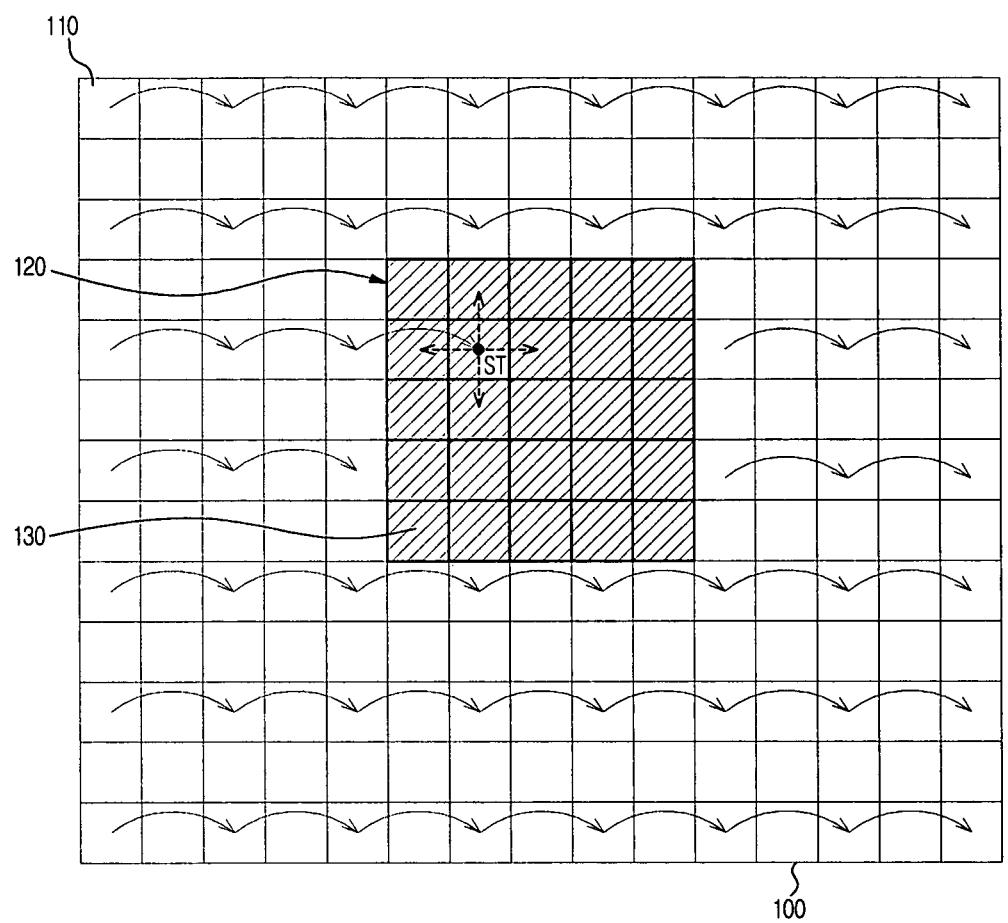
FIG. 2 illustrates the principle that the object detection apparatus according to the embodiment of the present invention detects an entire pixel region of an object.

FIG. 1 is a schematic block diagram of an object detection apparatus according to an embodiment of the present invention. FIG. 2 illustrates the principle that the object detection apparatus according to the embodiment of the present invention detects an entire pixel region of an object.

As shown in FIG. 1, the object detection apparatus according to the embodiment of the present invention includes an image acquisition unit 10, an image processing unit 20, a pixel comparison unit 30, a pixel search unit 40, and a pixel storage unit 50.

The image acquisition unit 10 acquires an image including an object received through an image capture device such as a camera.

When the image acquired through the image acquisition unit 10 is scanned at preset pixel intervals (i.e., at intervals of a preset number of pixels), the pixel comparison unit 30 compares a pixel value of each scanned pixel with a preset value. This allows the image processing unit 20 to determine whether or not each pixel is an object pixel having a target pixel value. When each pixel is binarized using a variety of scanning methods as described above, pixels are generally compared using if statements. When pixels of a general black-and-white (grayscale) image are inspected, time delay is not great since only two if statements are used to inspect the pixels. However, when pixels of a color image are inspected, a long calculation time is required since it is necessary to execute a number of if statements that is twice the number of color axes in a used color space. For example, when an RGB color space is used, the number of if statements used for pixel comparison is 6. Using 6 if statements every pixel causes significant load to the system. To overcome this problem, the present invention uses a lookup table for pixel comparison. Using the lookup table stored in a memory, whether the color value of the current pixel is a target value can be determined by reading a corresponding value from the memory. For example, although a grayscale image has a pixel value of 0 to 255, using the lookup table, it is possible to set the grayscale value of the corresponding pixel to "1" and to set the grayscale values of other pixels to "0". Thus, using the lookup table ensures that whether a color value obtained from a pixel in an image is true or false is determined directly from the memory. This lookup table method is more useful when there are a large number of values to be compared, for example when a color image is inspected, than when a grayscale image is inspected. That is, using the lookup table, whether a corresponding color pixel value is true or false can be determined simply by reading a corresponding true or false value from the memory without using a large number of if statements. This significantly contributes to the improvement of performance of the system.

As described above, when the image acquired through the image acquisition unit 10 is scanned at preset pixel intervals, a pixel value of each scanned pixel is compared with a preset value through the pixel comparison unit 30. If it is determined from the comparison that the pixel is an object pixel having a target pixel value, the pixel search unit 40 sequentially determines whether each pixel located around the object pixel has a target pixel value, while spreading to pixels located around the object pixel, to find all pixels constituting the object.

As shown in FIG. 2, when an object pixel 110 having a color pixel value to be found is detected while the image plane 100 is scanned while jumping pixels at preset pixel intervals according to the dot-line scanning method, the image processing unit 20 identifies the detected object pixel as an object pixel 130 belonging to an object 120 and sequentially determines whether or not each pixel located around the identified object pixel 130 (for example, each of an upper, lower, left, and right pixels of the object pixel 130) is an object pixel while spreading to pixels around the object pixel 130. Thus, the image processing unit 20 then stores position values of all the found pixels constituting the object in the pixel storage unit 50. That is, the image processing unit 20 inspects pixels around a pixel ST that has been determined to be an object pixel while spreading to pixels located at up, down, left, and right sides of the pixel ST. The image processing unit 20 performs pixel searching until a pixel having a target color pixel value is no longer found or until a color pixel region of a size defined by the user is completely searched. By repeating this procedure, it is possible to find all pixels constituting an object to be detected in a short time. This eliminates the need to perform conventional image processing methods such as labeling and grouping, so that an entire pixel region of an object to be detected can be simply, easily, quickly, and correctly found. The object 120 can be detected (or identified) by performing various filtering for noise removal after finding and storing all pixels constituting the object 120. The filtering for noise removal is performed since binary images generally contains noise due to non-uniform luminance or camera resolution.

Figure 3:
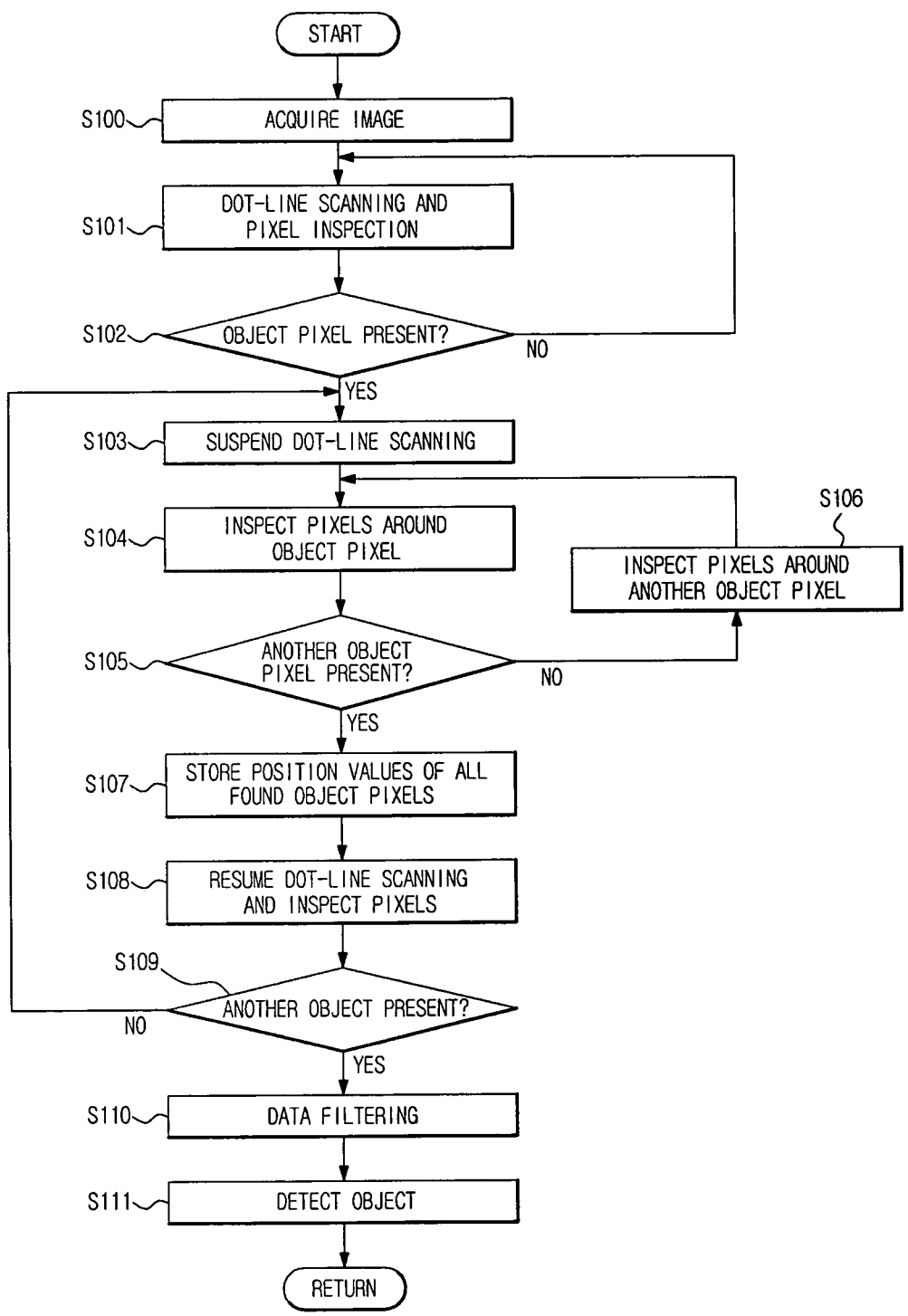
FIG. 3 is a flow chart illustrating a method to detect an object in an object detection apparatus according to an embodiment of the present invention.

FIG. 3 is a flow chart illustrating a method to detect an object in an object detection apparatus according to an embodiment of the present invention.

As shown in FIG. 3, first, the image processing unit 20 obtains an image including an object through the image acquisition unit 10 (S100).

After the image is obtained, the image processing unit 20 inspects each pixel of the image by comparing a pixel value of each pixel of the image with a preset target value through the pixel comparison unit 30 to determine whether the pixel is an object pixel or a general pixel while performing dot-line scanning on the image at preset pixel intervals (S101).

According to the inspection result, the image processing unit 20 determines whether or not an object pixel is present (S102). If no object pixel is present, the image processing unit 20 proceeds to operation S101 to perform subsequent operations. On the other hand, if an object pixel is present, the image processing unit 20 temporally stops dot-line scanning (S103) and sequentially inspects each pixel around the object pixel (for example, each of pixels located at up, down, left, and right sides of the object pixel) to determine whether or not the pixel value of each pixel around the object pixel is a preset target value (S104).

According to the inspection result, the image processing unit 20 determines whether or not another object pixel is present (S105). If another object pixel is present, the image processing unit 20 sequentially inspects each pixel around the object pixel to determine whether or not the pixel value of each pixel around the object pixel is a preset target value (S106) and then proceeds to operation S104. On the other hand, if another object pixel is not present, the image processing unit 20 stores position values of all found object pixels in the pixel storage unit 50 (S107).

After storing the position values of all the found object pixels, the image processing unit 20 resumes dot-line scanning and performs pixel inspection (S108).

The image processing unit 20 then determines whether or not another object is present (S109). If another object is present, the image processing unit 20 proceeds to operation S103 to perform subsequent operations. If another object is not present, the image processing unit 20 performs data filtering for noise removal (S110) and detects the object based on the position values of all object pixels constituting the object stored in the pixel storage unit 50 (S111).

Since the present invention performs labeling and grouping at once while having the advantage of quick image processing of the dot-line scanning method as described above, the present invention has an advantage in that it is possible to detect (or identify) an object in an image as soon as scanning of the image is completed.

With reference to FIGS. 4 to 23, a more detailed description is given of the procedure in which, when an object pixel is found during dot-line scanning, the image processing unit 20 sequentially determines whether each pixel around the object pixel has a target pixel value while spreading to pixels around the object pixel, thereby finding all pixels constituting an object.

To identify each object in addition to determining the size or orientation of the object, it is necessary to determine whether pixels are coupled or separated and thus to determine whether or not the pixels belong to one object or different objects. To determine whether or not one pixel is coupled to another pixel, typically, 4 or 8 neighbor pixels are defined and used. 4 neighbor pixels of a pixel located at a position (I,J) in an image plane are those located at positions (I+1,J), (I−1,J), (I,J+1), and (I,J−1) and 8 neighbor pixels thereof are the 4 neighbor pixels plus 4 pixels located at diagonal positions (I−1,J−1), (I−1,J+1), (I+1,J−1), and (I+1,J+1).

Figure 4:
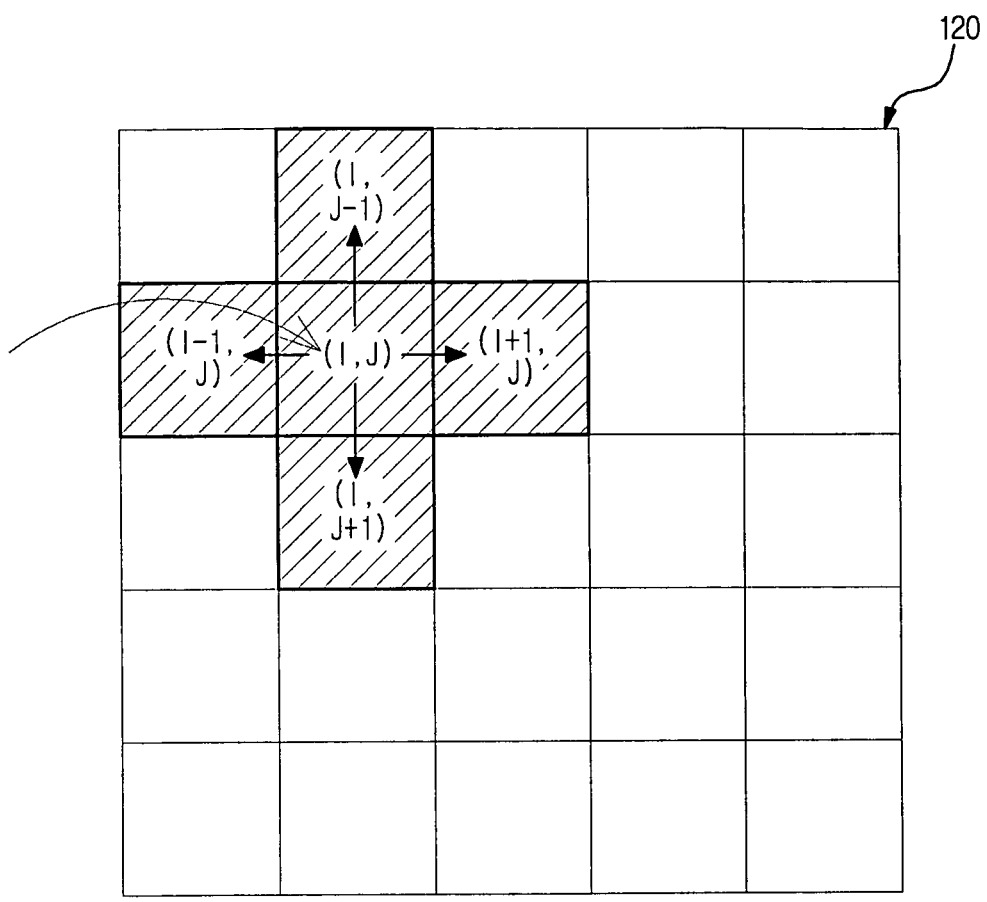
FIGS. 4 to 23 illustrate a procedure in which the object detection apparatus detects an entire pixel region constituting the object according to the embodiment of the present invention.

As shown in FIG. 4, when, during dot-line scanning, it is determined that the pixel (I,J) is an object pixel, the image processing unit 20 sequentially compares the pixel value of each of a right pixel (I+1,J), a lower pixel (I,J+1), a left pixel (I−1,J), and an upper pixel (I,J−1) of the pixel (I,J) in the named order with a preset target pixel value to determine whether or not the pixel value is equal to the target pixel value. If the pixel value is equal to the target pixel value, the image processing unit 20 determines that the corresponding pixel is an object pixel and stores the position value of the corresponding pixel. FIG. 4 illustrates that the right pixel (I+1,J), the lower pixel (I,J+1), the left pixel (I−1,J), and the upper pixel (I,J−1) of the object pixel (I,J) are all object pixels. Here, each of the right pixel (I+1,J), the lower pixel (I,J+1), the left pixel (I−1,J), and the upper pixel (I,J−1) around the object pixel (I,J) will also be referred to as a daughter pixel for ease of explanation.

Figure 5:
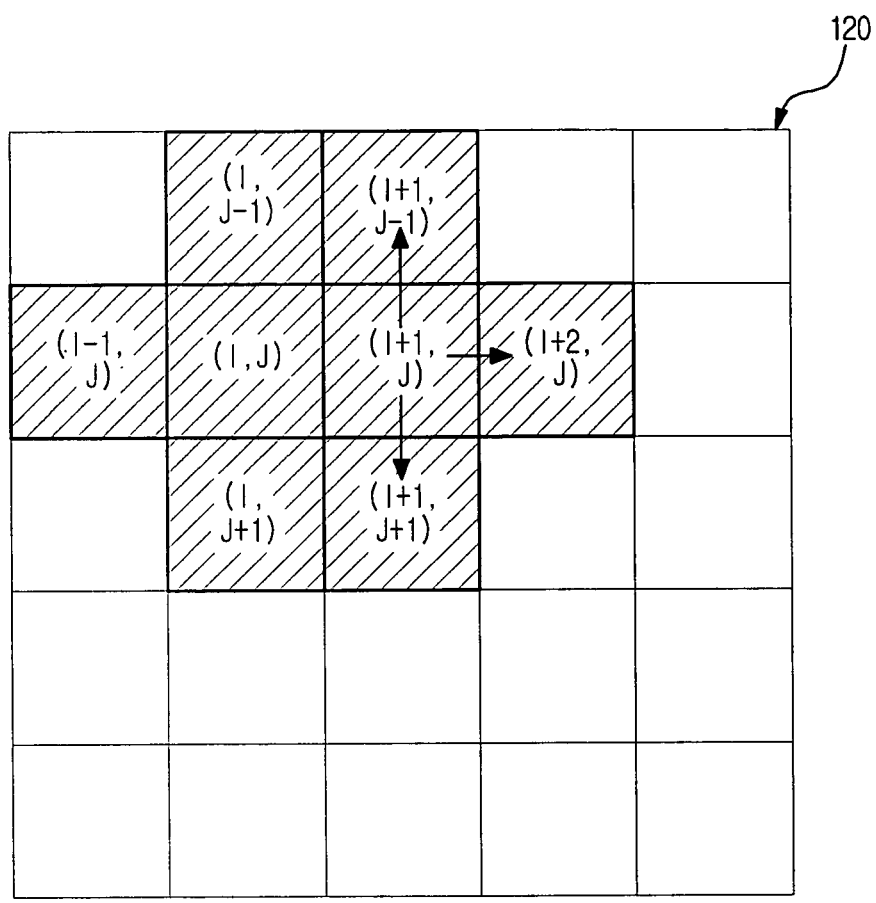

If it is determined that the right pixel (I+1,J), the lower pixel (I,J+1), the left pixel (I−1,J), and the upper pixel (I,J−1) around the object pixel (I,J) are all object pixels, for example, the image processing unit 20 determines whether or not each of a right pixel (I+2,J), a lower pixel (I+1,J+1), and an upper pixel (I+1,J−1) around the right pixel (I+1,J), which is a daughter pixel of the object pixel (I,J), is an object pixel as shown in FIG. 5. Here, the image processing unit 20 does not determine whether the left pixel (I,J) of the right pixel (I+1,J) is an object pixel since it is already known that the left pixel (I,J) is an object pixel. The image processing unit 20 then compares the pixel value of each of the right pixel (I+2,J), the lower pixel (I+1,J+1), and the upper pixel (I+1,J−1) of the pixel (I+1,J) with the preset target pixel value to determine whether or not the pixel value is equal to the target pixel value. If the pixel value is equal to the target pixel value, the image processing unit 20 determines that the corresponding pixel is an object pixel and stores the position value of the corresponding pixel. FIG. 5 illustrates that the three pixels (I+2,J), (I+1,J+1), and (I+1,J−1) in addition to the four pixels (I+1,J), (I−1,J), (I,J+1), and (I,J−1) are all object pixels. Here, each of the three pixels (I+2,J), (I+1,J+1), and (I+1,J−1) will also be referred to as a granddaughter pixel for ease of explanation.

Figure 6:
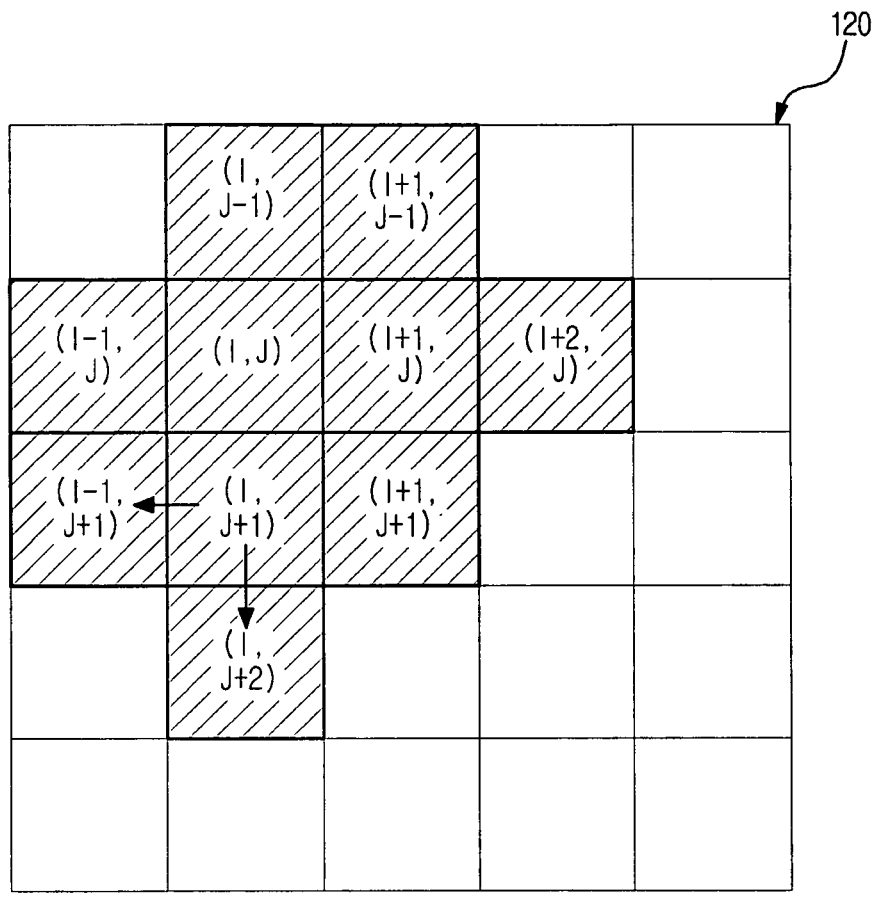
Figure 7:
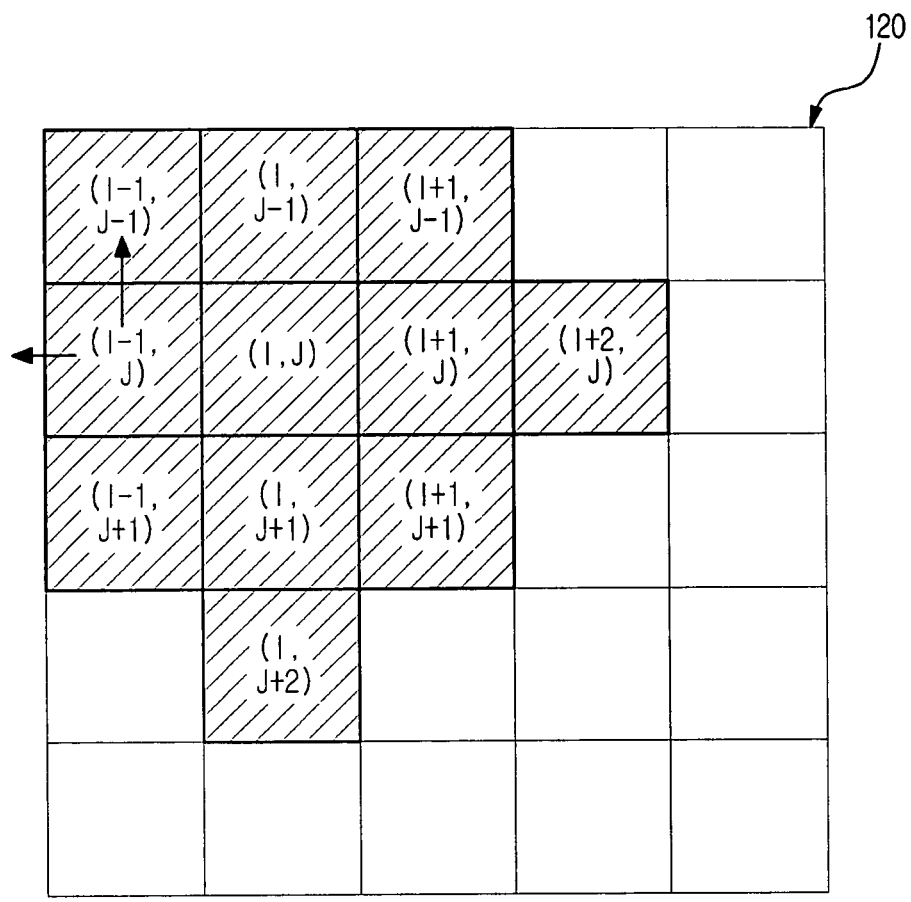
Figure 8:
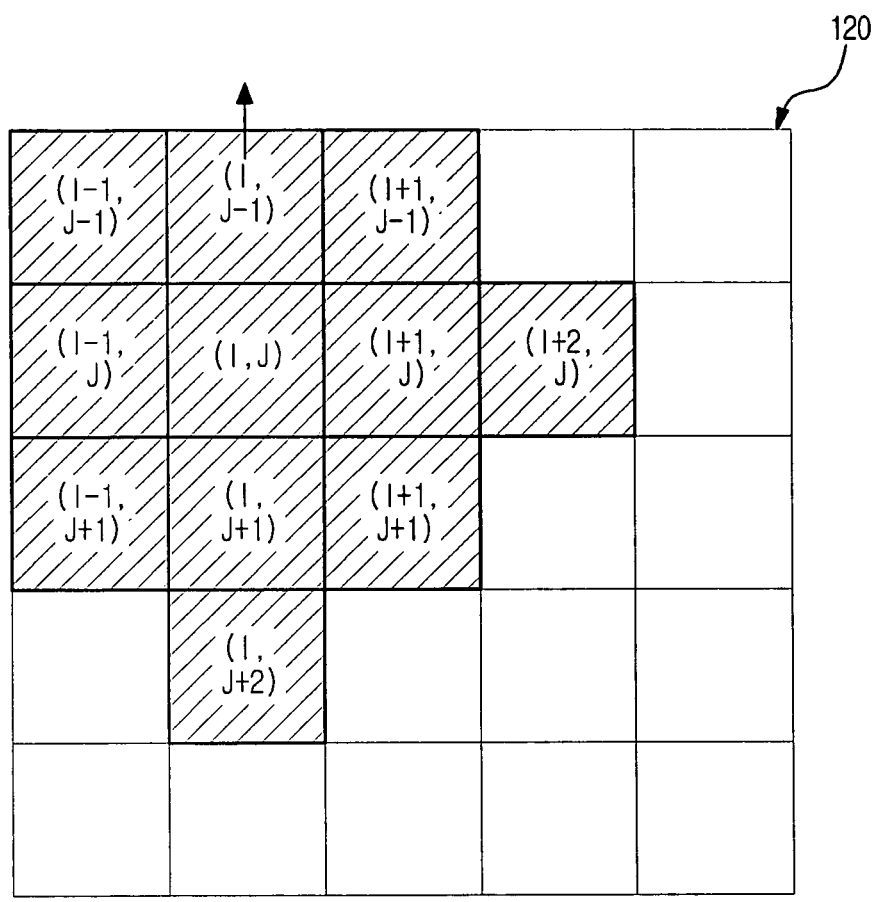
Figure 9:
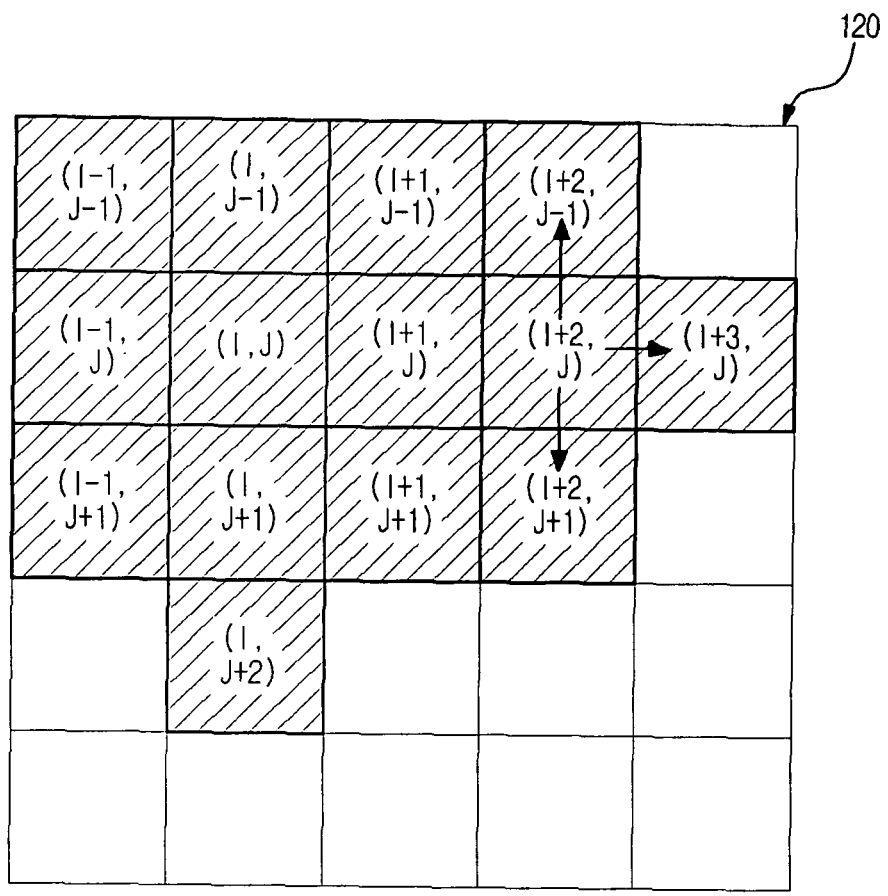
Figure 10:
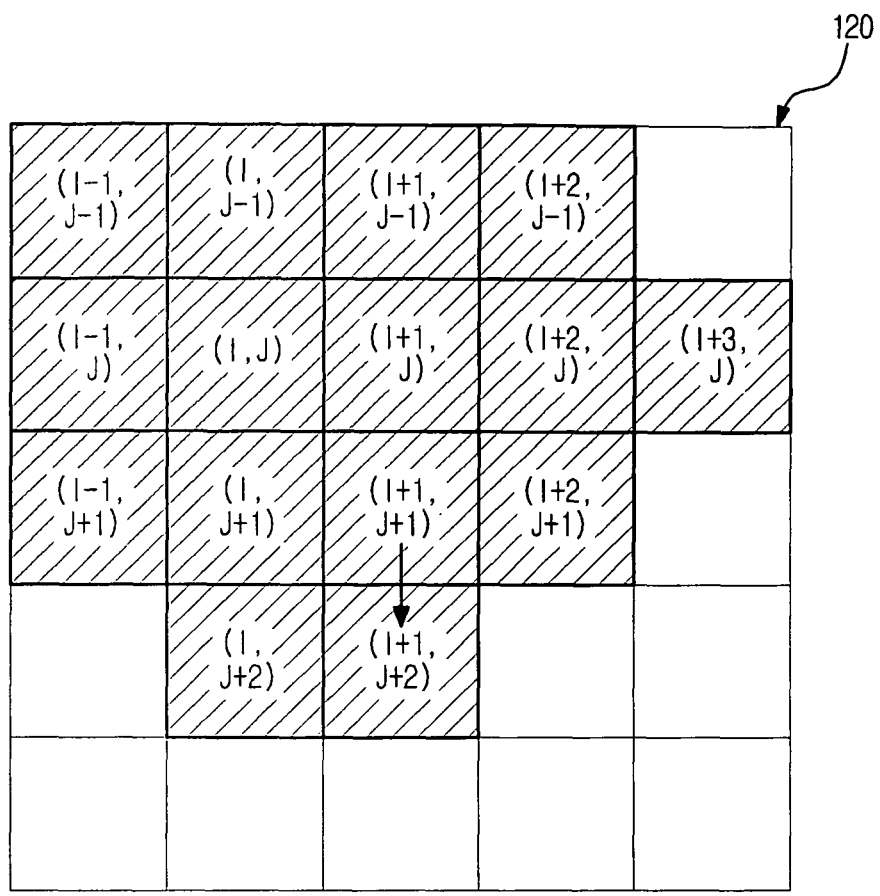
Figure 11:
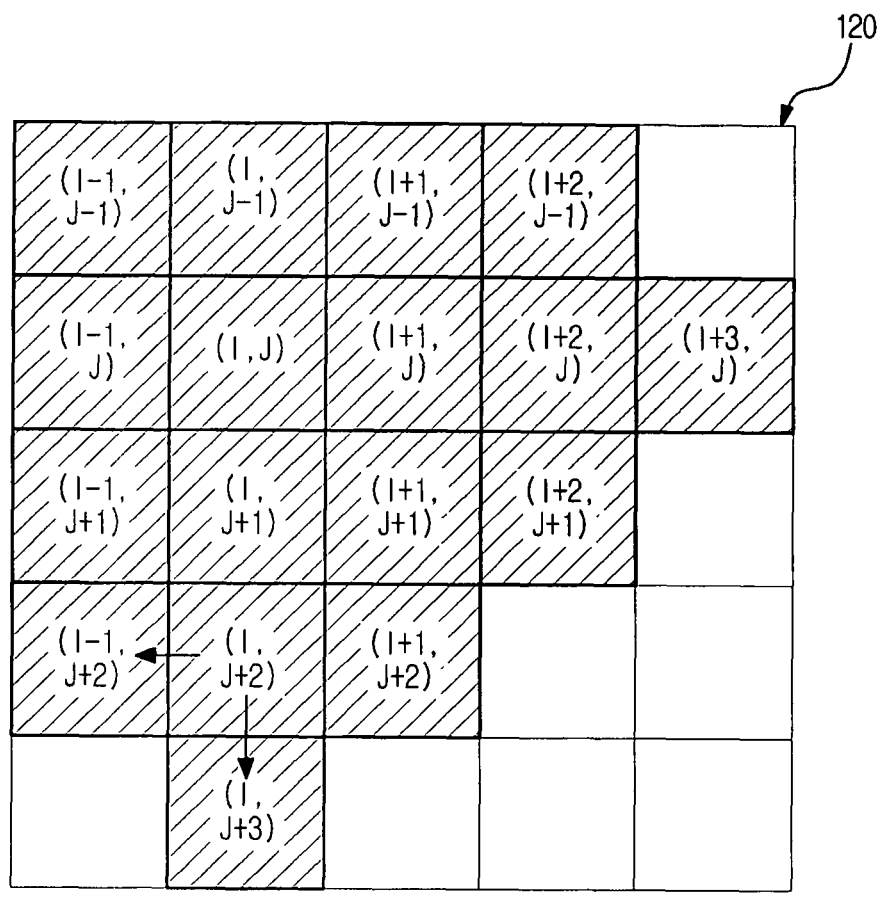
Figure 12:
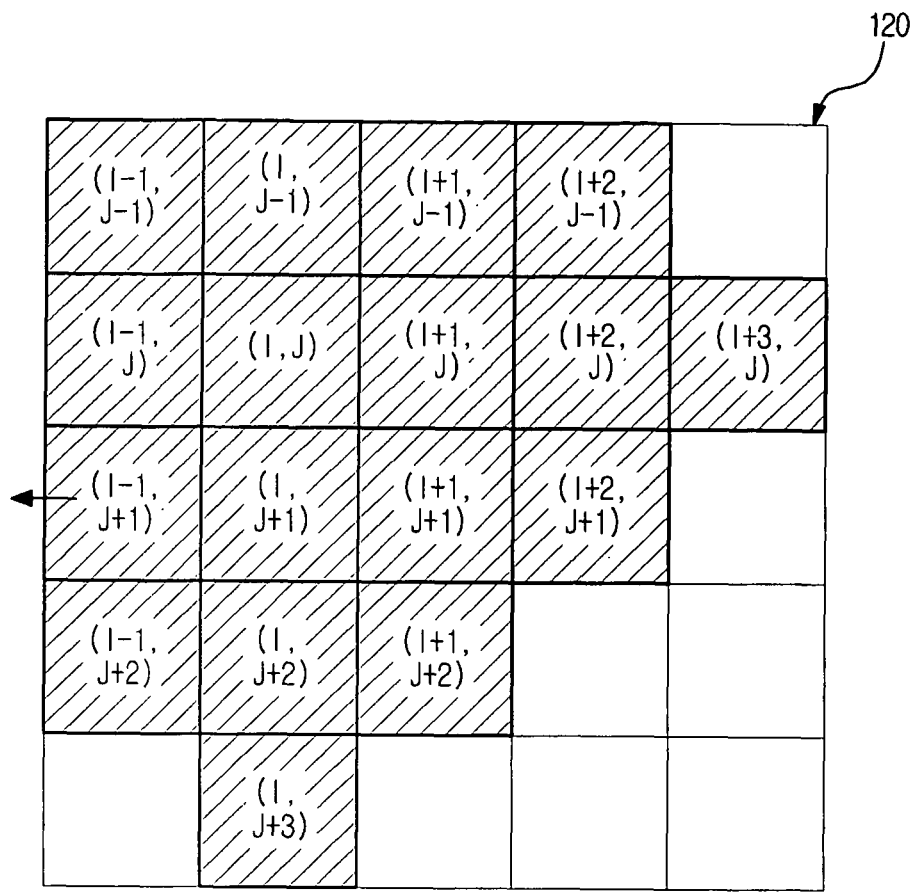
Figure 13:
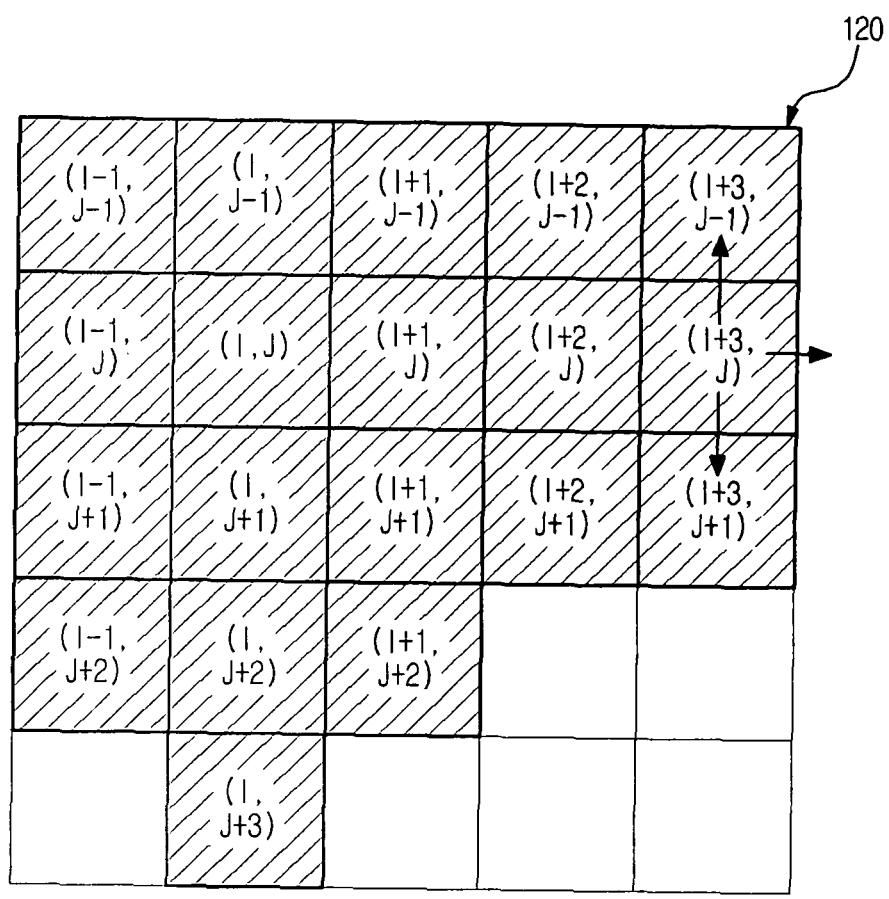
Figure 14:
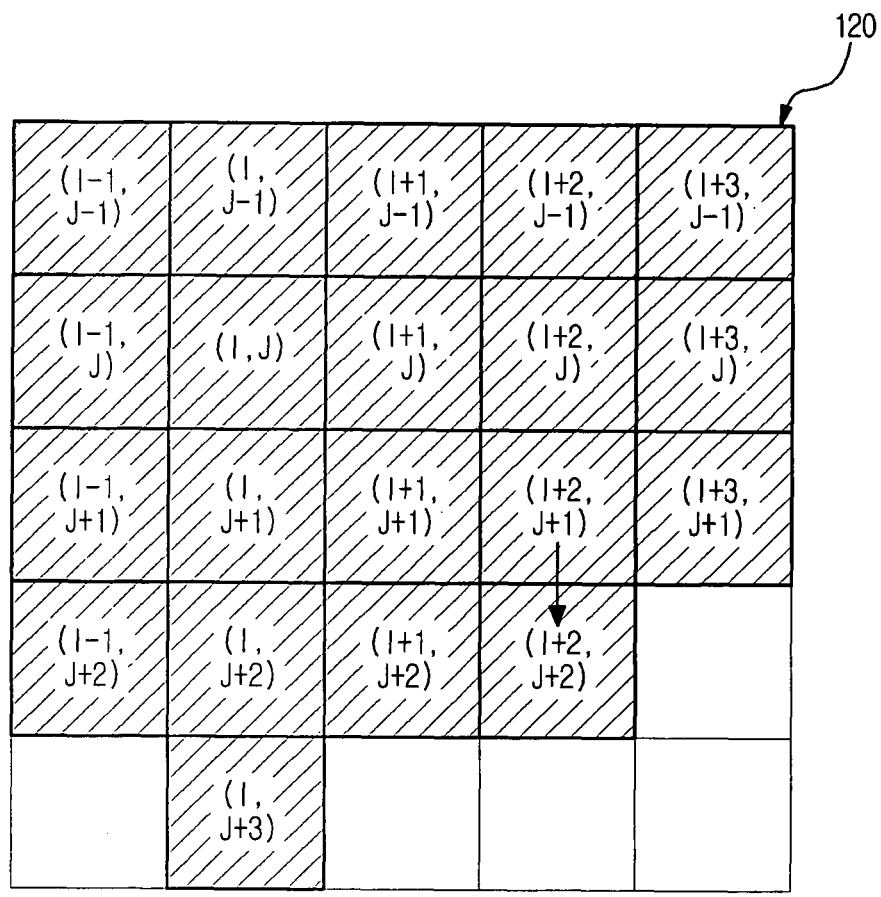
Figure 15:
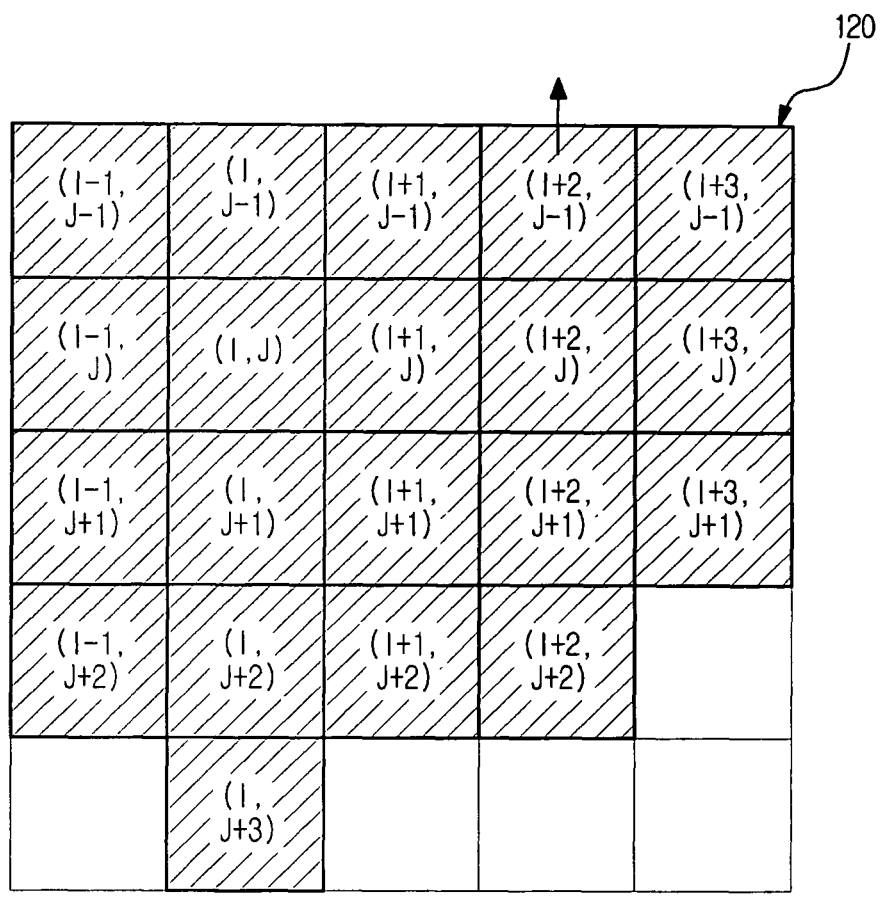
Figure 16:
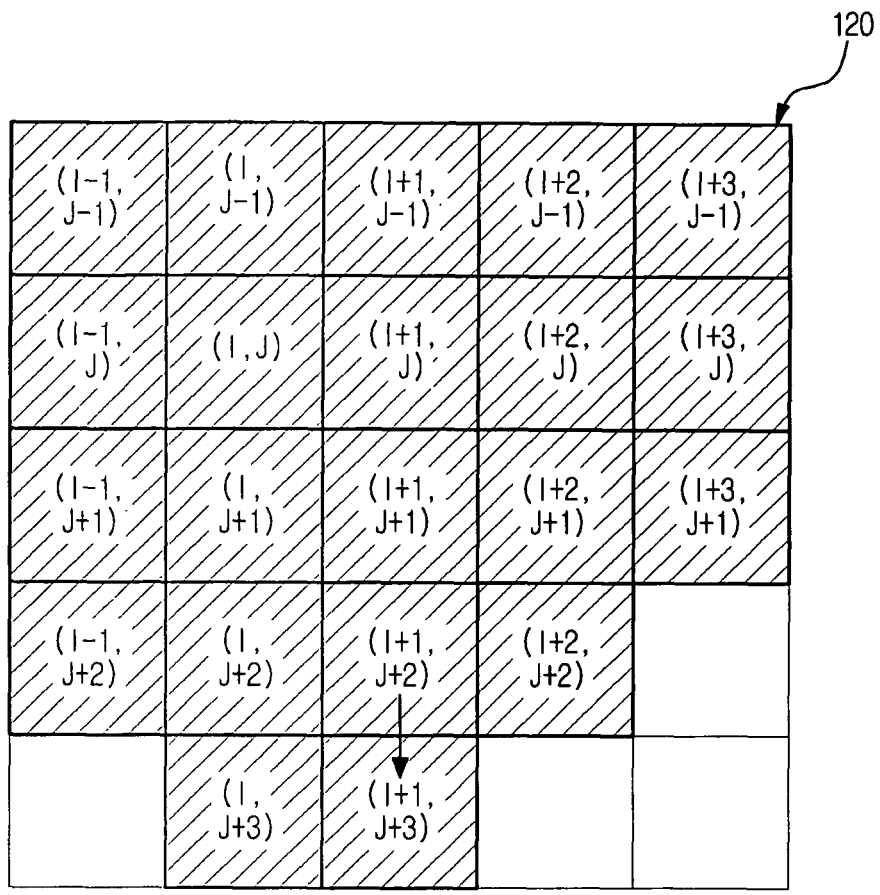
Figure 17:
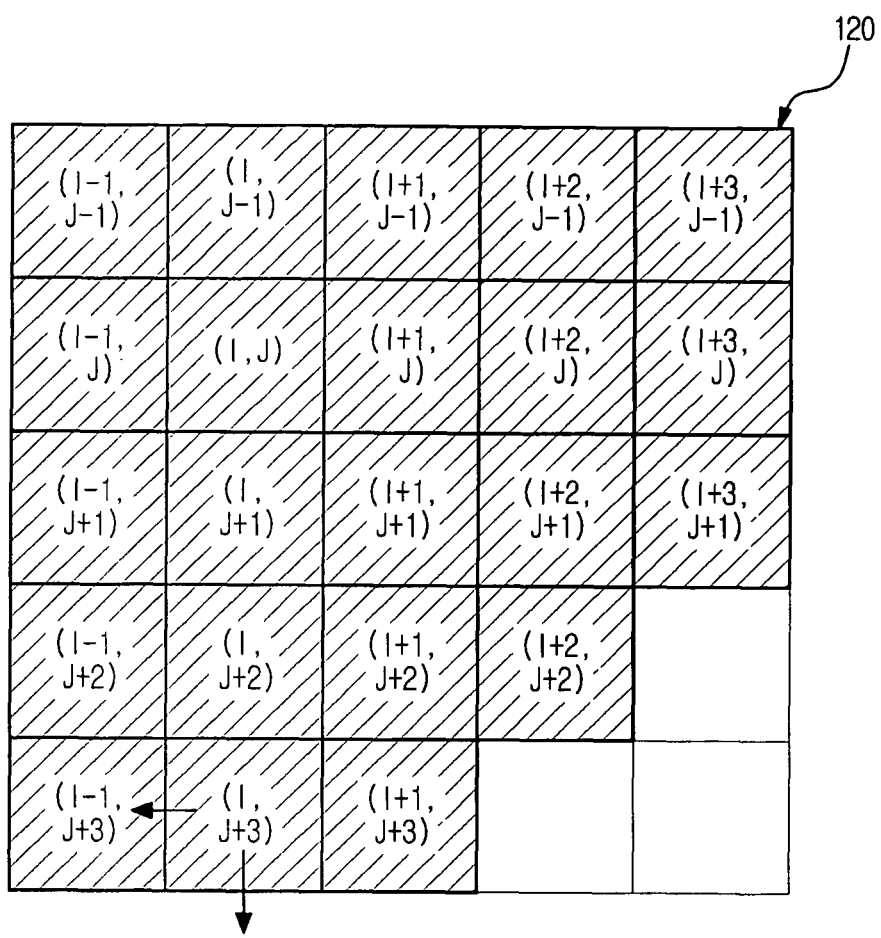
Figure 18:
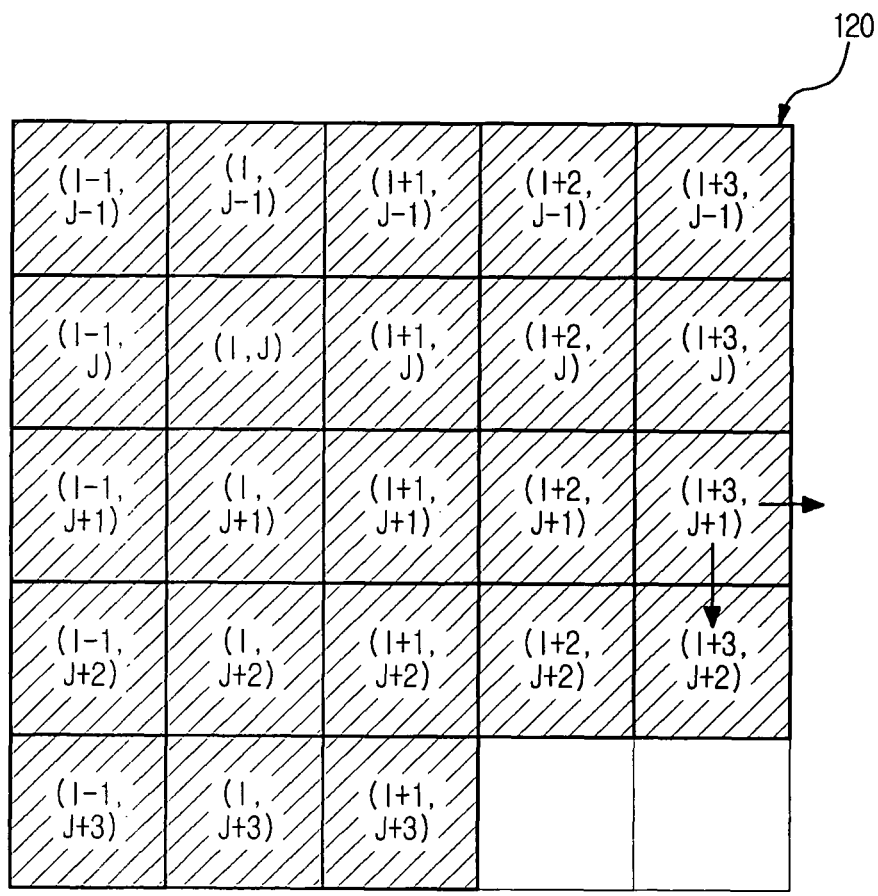
Figure 19:
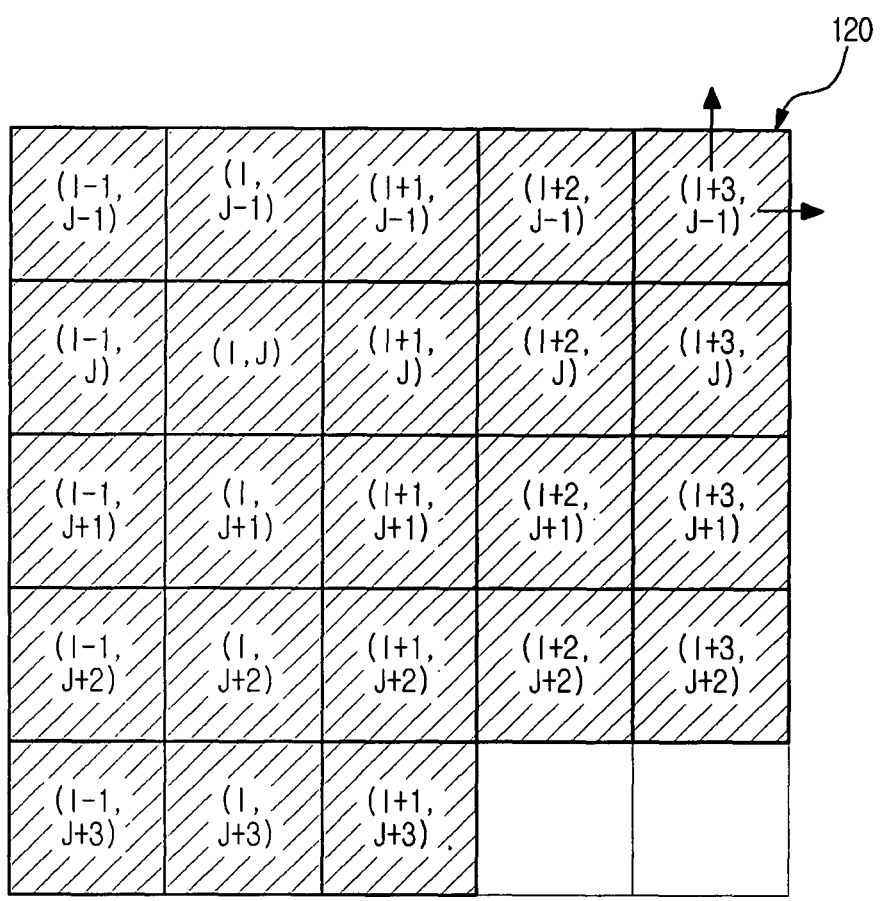
Figure 20:
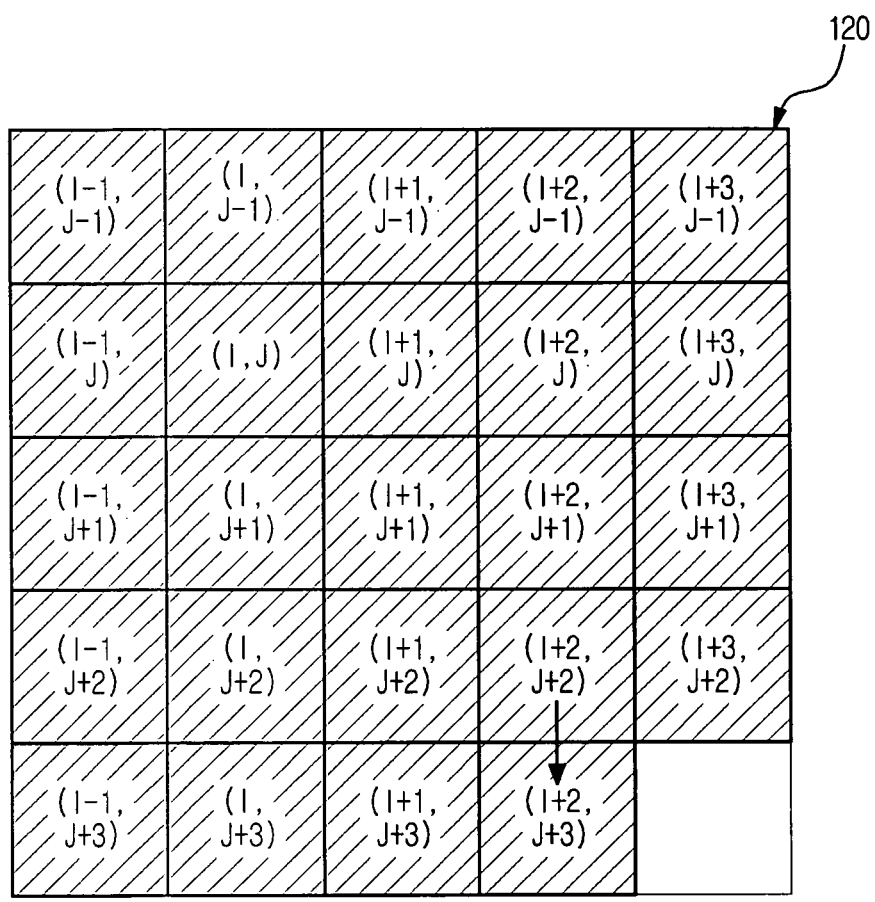
Figure 21:
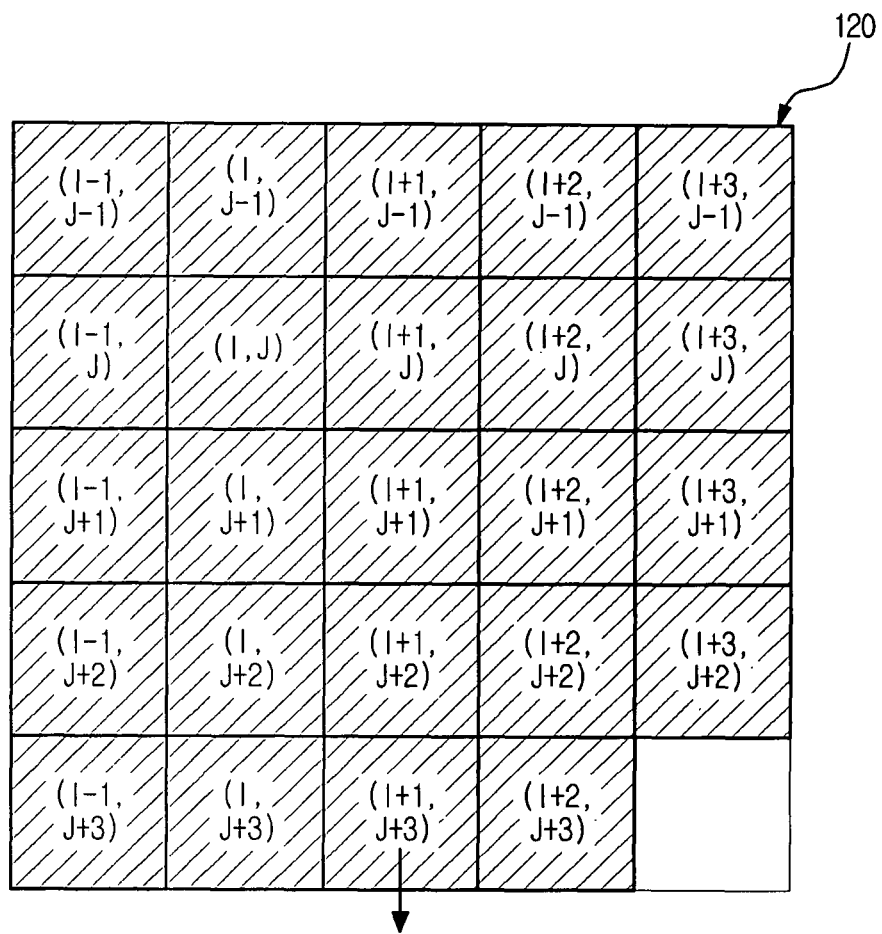
Figure 22:
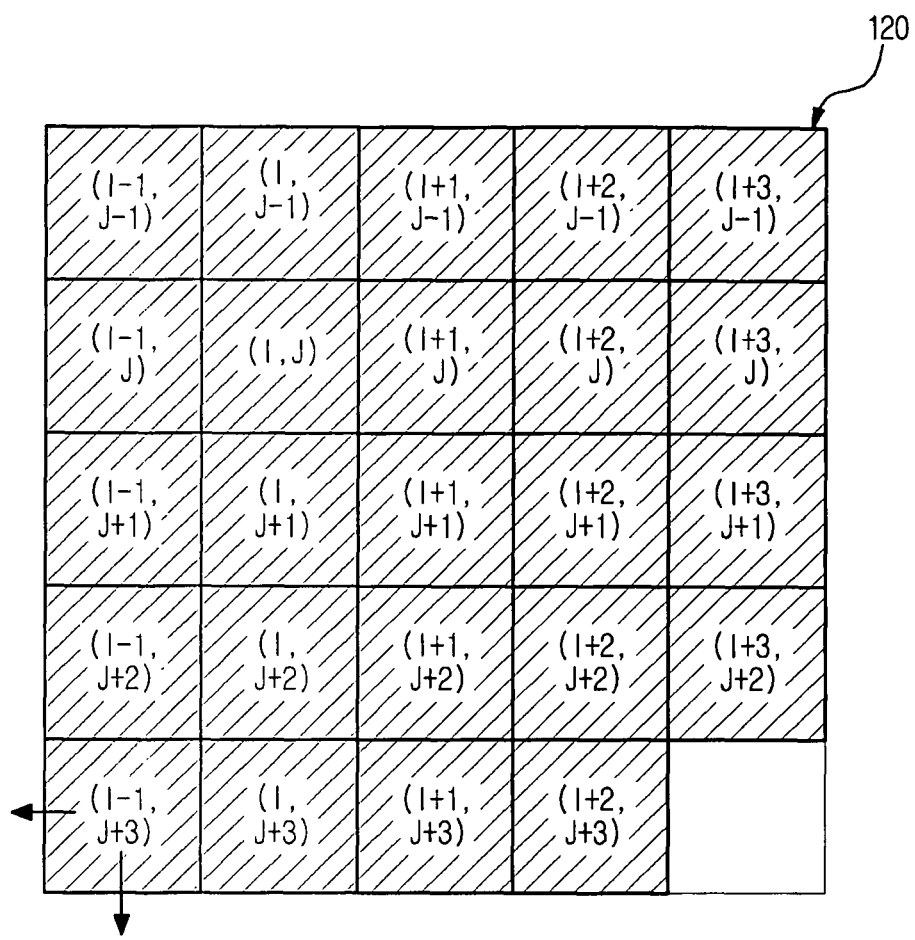
Figure 23:
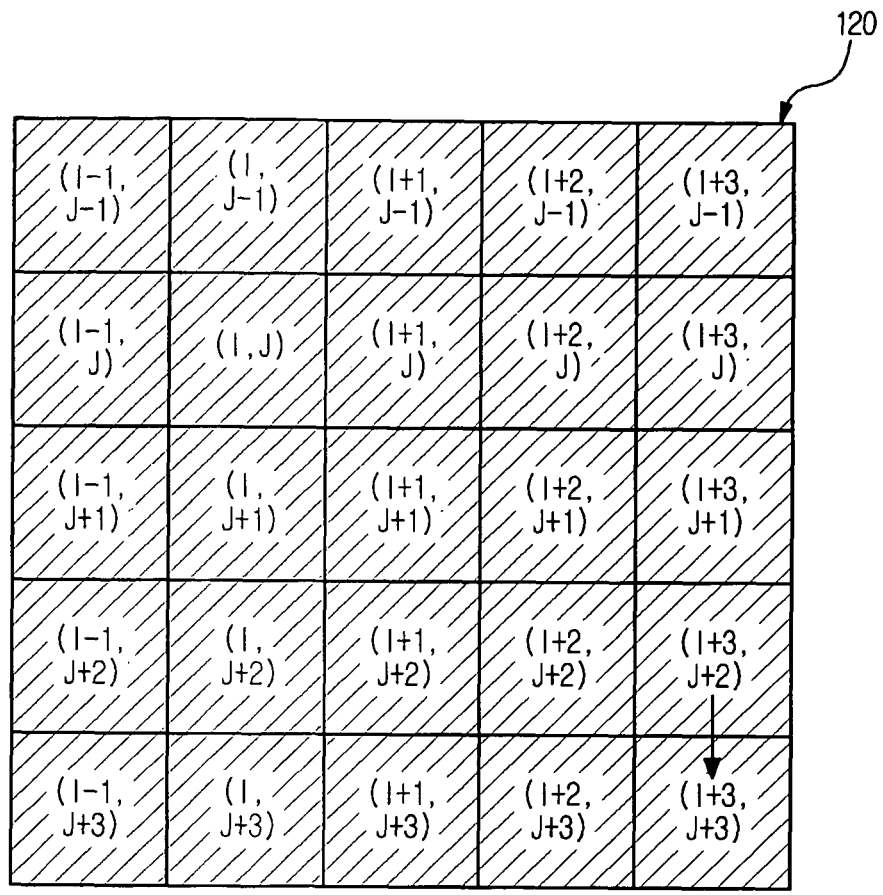

Then, the image processing unit 20 needs to determine whether or not each of the right pixel (I+1,J+1), a lower pixel (I,J+2), a left pixel (I−1,J+1), and the upper pixel (I,J) around the lower pixel (I+1,J), which is another daughter pixel of the object pixel (I,J), is an object pixel as shown in FIG. 6. However, since it is already known that the pixels (I+1,J+1) and (I,J) are object pixels, the image processing unit 20 determines whether or not each of the remaining pixels (I,J+2) and (I−1,J+1) is an object pixel.

In the above manner, the image processing unit 20 first determines whether or not each daughter pixel around a specific pixel that has been determined to be an object pixel is an object pixel and then determines whether or not each granddaughter pixel of the specific pixel is an object pixel.

The present invention is not limited to this method. For example, when it is determined that a daughter pixel of a specific pixel that has been determined to be an object pixel is an object pixel, the image processing unit 20 may determine whether or not an offspring pixel of the daughter pixel, such as a granddaughter pixel of the specific pixel corresponding to the daughter pixel, is an object pixel, instead of determining whether or not another daughter pixel of the specific pixel is an object pixel as described above, until an object pixel is no longer found and then may determine whether or not another daughter pixel of the specific pixel is an object pixel and then whether or not an offspring pixel of the daughter pixel is an object pixel. The determination may be performed on the pixels in an arbitrary order of pixels rather than in any specific order.

FIGS. 7 to 23 illustrate how the image processing unit 20 determine whether or not each pixel around the pixels, which have been determined to be object pixels in FIGS. 4 to 6, is an object pixel while spreading to the pixels using the method illustrated in FIGS. 4 to 6. A detailed description of FIGS. 7 to 23 is omitted herein since the same method as that of FIGS. 4 to 6 is applied.

As is apparent from the above description, the object detection method and apparatus according to the present invention has a variety of advantages. For example, when an object pixel having a target pixel value is found while an image including an object is scanned at intervals of a preset number of pixels, whether or not each pixel around the object pixel has the target pixel value is sequentially determined, while spreading to pixels around the object pixel, to find an entire pixel region constituting the object and position values of the found pixels are then stored. This ensures that an entire pixel region of the object can be simply, easily, quickly, and correctly found. In addition, the dot-line scanning is employed to achieve size filtering effects to eliminate small noise in searching. It is also possible to simplify calculation processes required to find all pixels of the object. This reduces required memory capacity, thereby decreasing the size of products.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. An object detection method comprising:
   obtaining an image including an object;
   determining whether or not an object pixel having a target pixel value is present while the obtained image is scanned at intervals of a preset number of pixels in a direction of scanning;
   finding all pixels constituting the object by sequentially determining, when an object pixel having the target pixel value is present, whether or not each pixel around the object pixel has the target pixel value while spreading to pixels around the object pixel; and
   storing position values of the found pixels,
   wherein when the object pixel having the target pixel is present, the scanning at intervals of the preset numbers of pixels is suspended and the finding of all pixels constituting the object is performed in a predetermined sequence pixel by pixel, and when an entire pixel region of the object is found, then the scanning at intervals is resumed.

2. The object detection method according to claim 1, wherein the stopped scanning is resumed after storing the position values of the found pixels.

3. The object detection method according to claim 1, wherein finding all the pixels constituting the object comprises determining whether or not each of neighbor pixels adjacent to the object pixel is an object pixel and determining, when it is determined that a neighbor pixel is an object pixel, whether or not each pixel around the neighbor pixel is an object pixel.

4. The object detection method according to claim 1, wherein, when a pixel that is an object pixel among pixels around the object pixel is defined as a daughter pixel and a pixel that is an object pixel among pixels around the daughter pixel is defined as a granddaughter pixel, finding all the pixels constituting the object comprises determining whether or not the daughter pixel is an object pixel and then determining whether or not the granddaughter pixel is an object pixel.

5. The object detection method according to claim 1, wherein determining whether or not an object pixel having the target pixel value is present comprises comparing a pixel value of a pixel, scanned while the obtained object is scanned at intervals of the preset number of pixels, with a value preset in a lookup table and determining that the pixel is an object pixel having the target pixel value when the pixel value of the scanned pixel is equal to the preset value.

6. The object detection method according to claim 1, wherein the preset number of pixels is at least 2 pixels.

7. The method of claim 1, wherein when the image is scanned at the preset pixel interval, a pixel value of each scanned pixel is compared with a preset value.

8. The method of claim 1, wherein the scanning at intervals is resumed from a pixel adjacent to the found entire pixel region of the object.

9. The method of claim 1, wherein the scanning at intervals comprises determining a pixel value of a respective pixel, skipping the preset number of pixels, and determining a pixel value of another pixel at a distance of the preset number of pixels from the respective pixel.

10. The method of claim 1, wherein scanning at intervals comprises skipping pixels horizontally and vertically.

11. An object detection apparatus, comprising:
    an image acquisition device configured to obtain an image including an object;
    an image processing device configured to perform a control operation to sequentially determine, when it is determined that an object pixel having a target pixel value is present while the obtained image is scanned at intervals of a preset number of pixels in a direction of scanning, whether or not each pixel around the object pixel has the target pixel value while spreading to pixels around the object pixel to find all pixels constituting the object; and
    a pixel storage device configured to store position values of the found pixels,
    wherein when the object pixel having the target pixel is present, the scanning at intervals of the preset numbers of pixels is suspended and the sequential determining is performed in a predetermined sequence pixel by pixel, and when an entire pixel region of the object is found, then the scanning at intervals is resumed.

12. The object detection apparatus according to claim 11, further comprising the pixel storage device configured to store the position values of the found pixels according to a control signal from the image processing device.

13. The object detection apparatus according to claim 11, further comprising a pixel search device configured to find all pixels constituting the object by sequentially determining, when the obtained image is scanned at intervals of the preset number of pixels, whether or not each pixel around the object pixel has the target pixel value while spreading to pixels around the object pixel according to a control signal from the image processing device.

14. The object detection apparatus according to claim 11, wherein the image processing device resumes the stopped scanning after storing the position values of the found pixels.

15. The object detection apparatus according to claim 11, wherein the image processing device determines whether or not each of neighbor pixels adjacent to the object pixel is an object pixel and determines, when it is determined that a neighbor pixel is an object pixel, whether or not each pixel around the neighbor pixel is an object pixel.

16. An object detection method, comprising:
    scanning an image at an interval of a preset number of pixels in a direction of scanning, the image including an object;
    upon detecting an object pixel of the object, having a target pixel value, suspending the scanning at the interval of the preset number of pixels and determining whether or not each pixel around the object pixel has the target pixel value in a predetermined sequence pixel by pixel until all of the object pixels of the object have been detected, and when an entire pixel region of the object is found, then the scanning at intervals is resumed; and storing the detected object pixels.

17. The object detection method of claim 16, wherein the scanning further comprises performing a dot-line scanning.

18. The object detection method according to claim 16, wherein the interval of the preset number of pixels is 2 pixels in a horizontal direction.

* * * * *